US005770535A

United States Patent [19]

Brix et al.

[11] Patent Number: 5,770,535

[45] Date of Patent: Jun. 23, 1998

[54] ALKALI-FREE ALUMINOBOROSILICATE GLASS AND ITS USE

[75] Inventors: Peter Brix, Mainz; Gerhard Lautenschlager, Jena; Klaus Schneider, Apolda; Thomas Kloss, Jena, all of Germany

[73] Assignee: Schott Glaswerke, Mainz, Germany

[21] Appl. No.: 791,949

[22] Filed: Jan. 31, 1997

[30] Foreign Application Priority Data

Feb. 2, 1996 [DE] Germany ....................... 196 03 698 .4

[51] Int. Cl.[6] ..................................................... C03C 3/093

[52] U.S. Cl. ................................................ 501/67; 501/70

[58] Field of Search .......................................... 501/67, 70

[56] References Cited

U.S. PATENT DOCUMENTS

| | | | |
|---|---|---|---|
| 3,496,401 | 2/1970 | Dumbaugh, Jr. . | |
| 4,640,900 | 2/1987 | Kokubu et al. | 501/67 |
| 5,244,847 | 9/1993 | Kushitani et al. | 501/66 |
| 5,348,916 | 9/1994 | Kushitani et al. | 501/70 |
| 5,508,237 | 4/1996 | Moffat et al. | 501/70 |

FOREIGN PATENT DOCUMENTS

| | | |
|---|---|---|
| 510544 | 4/1992 | European Pat. Off. . |
| 2058210 | 7/1972 | Germany . |
| 43 25 656 | 2/1995 | Germany . |
| 63283710 | 5/1990 | Japan . |
| 2298915 | 6/1992 | Japan . |
| 7038279 | 10/1995 | Japan . |
| 1338386 | 11/1973 | United Kingdom . |
| 89/02877 | 4/1989 | WIPO . |

*Primary Examiner*—Karl Group
*Attorney, Agent, or Firm*—Millen, White, Zelano & Branigan, P.C.

[57] ABSTRACT

An alkali-free aluminoborosilicate glass preferably with a thermal expansion $\alpha_{20/300}$ of about 3.7 $\times 10^{-6}$/K, an annealing temperature OKP of above 700° C., a treatment temperature $V_A$ of less than 1220° C., and very good chemical stability, which can be produced in a float unit and has the following composition (in % by weight based on oxide): $SiO_2$ 52–62; $B_2O_3$ 4–14; $Al_2O_3$ 12–20; MgO 0–8; CaO 4–11; BaO 0–2; ZnO 2–8; $ZrO_2$ 0–2; $SnO_2$ 0–2. The ratio of $Al_2O_3/B_2O_3$ is preferably equal to or greater than 3. The glass is especially suitable for use in display technology.

13 Claims, No Drawings

ALKALI-FREE ALUMINOBOROSILICATE GLASS AND ITS USE

The invention relates to an alkali-free aluminoborosilicate glass for use in display technology, which can be produced with good quality by the float process.

BACKGROUND OF THE INVENTION

The requirements of a glass that is to be used in display technology, e.g., as a front panel for a flat screen, have been described in detail by W. H. Dumbaugh, P. L. Bocko and F. P. Fehlner ("Glasses for Flat-Panel Displays" in "High-Performance Glasses," edited by M. Cable and J. M. Parker, Blackie and Son Limited, Glasgow and London, 1992). The glasses that are now available for such uses are also listed in the article "Advanced Glass Substrates for Flat Panel Display" by J. C. Lapp, P. L. Bocko and J. W. Nelson, Corning Research 1994.

Glasses that are to be used as substrates in LCDs (Liquid Crystal Displays), AMLCDs (Active Matrix Liquid Displays), TFELDSs (Thin-Film Electroluminescent Displays), or PDPs (Plasma Display Panels) must have good stability with regard to thermal cyclic loading and good chemical stability relative to the reagents that are used in the production process of flat screens and are adapted in their thermal expansion performance to polycrystalline silicon. In addition, these glasses should be as alkali-free as possible to keep from contaminating integrated circuits that may be applied directly to the glass substrate, by inward-diffusing alkali ions. In this case, production-related portions of sodium oxide of up to a content of 1000 ppm can be tolerated in the glass.

The glass panes that are suitable for the production of flat screens must have good inherent stability at the temperatures that occur in the production process, low shrinkage (compaction), and very good quality in terms of the absence of crystalline inclusions, nodes, and bubbles.

Preferred properties of glasses for flat display uses are thus:

- a thermal expansion coefficient $\alpha_{20/300}$ of about $3.7\times 10^{6}$/K (for adaptation to polycrystalline silicon)
- a temperature for viscosity at $10^{13}$ dPas (=annealing temperature OKP) of above 700° C. (for low compaction)
- good chemical resistance
- low tendency toward devitrification.

The above-mentioned requirements are basically met by a commercially available glass (V1) which, according to analysis, has the following approximate composition (in % by weight based on oxide): $SiO_2$ 57.7; $B_2O_3$ 8.4; $Al_2O_3$ 16.4; MgO 0.8; CaO 4.2; SrO 2.0; BaO 9.5; $As_2O_3$ 1.0. This glass is produced according to a special "overflow-fusion" process, which ensures the fabrication of thin glasses with high surface quality. The glasses that are suitable for this process, however, should exhibit only an extremely slight tendency toward crystallization, i.e., the liquid temperature (above this temperature, any crystals that form re-dissolve) must lie clearly below treatment temperature $V_A$, (temperature for viscosity at $10^4$ dPas). This may also be the main reason for the very high $V_A$ value of this glass of >1300° C. The higher the $V_A$, however, the quicker the corrosion of the refractory materials and the higher the primary energy losses during the production of glass from the batch.

Another drawback of above-mentioned glass V1 is the large proportion of arsenic oxide, which is apparently necessary as a refining agent to ensure a minimum of bubbles in the selected production process.

Apart from the fact that, owing to the toxicity of arsenic oxide, it is a good idea to avoid the use of these glass components, the effect of the presence of arsenic oxide is that such glasses cannot be drawn on a float unit by a float process since the reduction conditions prevailing here (liquid tin, reducing protective gas atmosphere, generally, forming gas) result in precipitation of metallic arsenic, which imparts an undesirable gray coloring to the glasses, making them unusable.

In U.S. Pat. No. 3,496,401, glass composition ranges (% by weight based on oxide) are indicated for halogen bulb cones similar to the composition of glass V1: $SiO_2$ 55–70; $B_2O_3$ 0–10; $Al_2O_3$ 13–25; alkaline-earth oxides 10–25. No indications about the refining are given, however. The thermal expansions of these glasses are low, and the temperatures for viscosity of $10^{13}$ dPas are high. Their chemical stability is not described.

Japanese laid-open specification JP 2-133 334 describes alkali-free glasses for electronic components that have good heat resistance, chemical stability, and optical homogeneity and exhibit the following composition ranges (% by weight based on oxide): $SiO_2$ 54–60; $B_2O_3$ 6–10; $Al_2O_3$ 10–15; MgO 0–2; CaO 8–15; BaO 4–10;ZnO 1–6; $TiO_2$ and/or $Zro_2$ 0.3–4.

SUMMARY OF THE INVENTION

An object of this invention is to provide a transparent glass for use in display technologies that preferably has a thermal expansion coefficient $\alpha_{20/300}$ of about $3.7\times10^{-6}$/K, a temperature in which the glass has a viscosity of $10^{13}$ dPas, of above 700° C., a treatment temperature $V_A$ of less than 1220° C., and very good chemical stability and is basically free of alkali oxides. In addition, it is to be essentially free of readily reducible components and thus can be produced by a float glass process on a float unit.

Upon further study of the specification and appended claims, further objects and advantages of this invention will become apparent to those skilled in the art.

The inventive glass contains 50 to 62% by weight of $SiO_2$. In the case of larger portions, $V_A$ assumes excessively high values. In the case of smaller portions, good hydrolytic stability is impaired. The range of 55 to 60% by weight is preferred.

The $Al_2O_3$ content is from 12 to 20% by weight. $V_A$ also increases here in the case of larger portions. At contents that are too small, crystallization phenomena occur. The range of 15 to 18% by weight is preferred.

To achieve the desired good chemical stability, the glass contains 4–14% by weight of $B_2O_3$, which in addition acts as a fluxing agent in this range and ensures the meltability of glasses in common aggregates. The range of 5 to 12% by weight is preferred. In an especially preferred embodiment of the invention, components $Al_2O_3$ and $B_2O_3$ are present at a ratio by weight of $Al_2O_3/B_2O_3 \geqq 3$.

The very good chemical stability of the glass is indicated by the data in Table 1. For example, the hydrolytic resistance according to ISO 719 of, for example, 12 or 13 μg of $Na_2O$/g is considered a "very high resistant glass"; see Schott, TECHNICAL GLASSES: Physical and Chemical Properties, ed. 1990, Mainz, Germany.

The alkaline-earth oxides as well as $ZrO_2$ and ZnO, as desired, raise the annealing temperature OKP. The glass therefore contains 4 to 11% by weight of CaO (preferably 6–10% by weight), 0–8% by weight of MgO (preferably 0–6% by weight), and 0–2% by weight of BaO (preferably 0–1% by weight). This small proportion of barium oxide in comparison to glass V1 enhances the desired low density of the glasses. Other advantages of this low BaO content are mentioned in the discussion of the refining agent.

The glass according to the invention also contains 2 to 8% by weight of ZnO (preferably 2–6% by weight) and 0–2% by weight of $ZrO_2$. Owing to their poor solubility, the maximum proportions of the last-mentioned components are very limited in the glass system.

In an especially advantageous embodiment of the invention, the two components MgO and CaO are introduced as dolomite. This simplifies the logistics of batch preparation. With the molar ratio of 1:1 that is thus obtained, the ratio by weight of CaO/MgO is about 1.4.

In addition, the glass can contain up to 2% by weight of $SnO_2$. A content of 0.5 to 2.0% by weight is preferred, and the range of from 0.5 to 1.0% by weight is especially advantageous.

For the reason that is already mentioned above (reduction to elementary arsenic), no arsenic oxide can be used to refine glasses that are drawn into panes on a float unit after the actual melting process. The same applies for the antimony oxide that is otherwise frequently used as an alternative, but is not used herein.

Common salt represents another standard refining agent that is frequently used in alkali oxide-containing melts and contributes to refining by its sublimation starting at about 1410° C., whereby a portion of the sodium chloride used shows up again in the glass in the form of sodium oxide. Since display glasses must be as alkali-free as possible, however, the use of this refining agent is also not possible here.

Alkaline-earth chlorides, of which especially barium chloride has proven effective, are also suitable as refining agents since they have a refining potential similar to that of common salt. The sublimation temperature, which is about 150° C. higher, also requires correspondingly higher melting temperatures however. An additional drawback of this component is the considerable toxicity of all soluble barium compounds, which makes it necessary to take expensive safety measures during preparation, for example, in the batch house, and in the case of heat treatment to maintain the maximum permissible concentration values when using barium chloride refining. Thus, the barium content is kept to a small proportion or is absent.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. 196 03 698.4, filed Feb. 2, 1996, are hereby incorporated by reference.

EXAMPLES

Table 1 shows two glasses according to the invention, with their compositions and their properties according to the invention. The glasses were smelted from conventional raw materials at 1620° C. For refining, the melt was kept at 1600° C. for two and one-half hours.

TABLE 1

Glass composition (in % by weight based on oxide) and essential properties of glasses

| | | Example 1 | Example 2 |
|---|---|---|---|
| $SiO_2$ | | 57.00 | 59.40 |
| $B_2O_3$ | | 5.00 | 5.00 |
| $Al_2O_3$ | | 18.00 | 15.00 |
| MgO | | 5.80 | 5.10 |
| CaO | | 6.60 | 7.10 |
| BaO | | 1.00 | 1.00 |
| ZnO | | 3.60 | 5.40 |
| $ZrO_2$ | | 2.00 | 1.00 |
| $SnO_2$ | | 1.00 | 1.00 |
| $\alpha_{20/300}$ [1)] | [$10^{-6}$/K] | 3.68 | 3.72 |
| Tg[2)] | [°C.] | 725 | 706 |
| OKP[3)] | [°C.] | 732 | 719 |
| EW[4)] | [°C.] | 927 | 916 |
| $V_A$ [5)] | [°C.] | 1218 | 1216 |
| density | [$10^3$ kg/m$^3$] | 2.603 | 2.597 |
| compaction[6)] | [ppm] | | −6 |
| hydrolytic resistance according to ISO 719 | [μg of $Na_2O$/g] | 12 | 13 |
| $H_2O$[7)] | [mg/cm$^2$] | | 0.02 |
| 5% HCl[8)] | " | | 0.16 |
| 5% NaOH[9)] | " | | 0.64 |
| 10% $NH_4F$:HF[10)] | " | | 0.03 |

1)Thermal expansion in the temperature range of 20 to 300° C.
2)Dilatometric glass transformation temperature according to DIN 52324
3)Annealing temperature, temperature for the $10^{13}$ dPas viscosity
4)Softening point, temperature for the $10^{7.6}$ dPas viscosity
5)Treatment temperature, temperature for the $10^4$ dPas viscosity
6)Shrinkage after tempering of the glass at 400° C. for one hour
7)Loss in weight after treatment of polished glass lamina (70 mm × 50 mm × 2 mm) in water for 24 hours at 95° C.
8)Loss in weight after treatment of polished glass lamina (70 mm × 50 mm × 2 mm) in 5% hydrochloric acid for 24 hours at 95° C.
9)Loss in weight after treatment of polished glass lamina (70 mm × 50 mm × 2 mm) in 5% sodium hydroxide solution for 6 hours at 95° C.
10)Loss in weight after treatment of polished glass lamina (70 mm × 50 mm × 2 mm) in 10% $NH_4F$-HF solution for 20 minutes at 20° C.

What is claimed is:

1. Alkali-free aluminoborosilicate glass of the following composition, in % by weight based on oxide:

$SiO_2$ 52–62
$B_2O_3$ 4–14
$Al_2O_3$ 12–20
MgO 0–8
CaO 4–11
BaO 0–2
ZnO 2–8
$ZrO_2$ 0–2
$SaO_2$052 0–2.

2. Aluminoborosilicate glass according to claim 1 with a composition, in % by weight based on oxide, of $SiO_2$ 55–60
$B_2O_3$ 5–12
$Al_2O_3$ 15–18
MgO 0–6
CaO 6–10
BaO 0–1
ZnO 2–6
$ZrO_2$ 0–2
$SnO_2$ 0.5–1.

3. Aluminoborosilicate glass according to claim 1 with a ratio by weight of $Al_2O_3$:$B_2O_3$ ≧3.

4. Aluminoborosilicate glass according to claim 1 with a molar ratio of CaO:MgO=1.

5. Aluminoborosilicate glass of claim 1, having a thermal expansion of $\alpha_{20/300}$ of about $3.7\times10^{-6}$/K, an annealing temperature OKP of above 700° C., a treatment temperature $V_A$ of less than 1220° C. and a very good chemical stability.

6. Aluminoborosilicate glass of claim 5, produced by a float glass process.

7. A display comprising a display screen of the glass of claim 1.

8. The display of claim 7, wherein the display screen is a flat panel display screen.

9. An aluminoborosilicate glass of claim 1, having a thermal expansion, $\alpha_{20/300}$, of about $3.7\times10^{-6}$/K.

10. An aluminoborosilicate glass of claim 1, having an annealing temperature, OKP, of above 700° C.

11. An aluminoborosilicate glass of claim 1, having a treatment temperature, $V_A$, of less than 1200° C.

12. An aluminoborosilicate glass of claim 1, having a hydrolytic resistance according to ISO 719 of about 12–13 μg of $Na_2O$/g.

13. An aluminoborosilicate glass of claim 1, having no BaO content.

* * * * *

UNITED STATES PATENT AND TRADEMARK OFFICE

CERTIFICATE OF CORRECTION

PATENT NO. : 5,770,535

DATED : June 23, 1998

INVENTOR(S) : Peter BRIX et al.

It is certified that error appears in the above-identified patent and that said Letters Patent is hereby corrected as shown below:

Column 4, line 51,

Claim 1, 11, change "$SaO_2$052 0-2" to -- $SnO_2$ 0.5-2 --.

Signed and Sealed this

Twenty-fourth Day of November, 1998

Attest:

BRUCE LEHMAN

Attesting Officer

Commissioner of Patents and Trademarks